Figure 1:
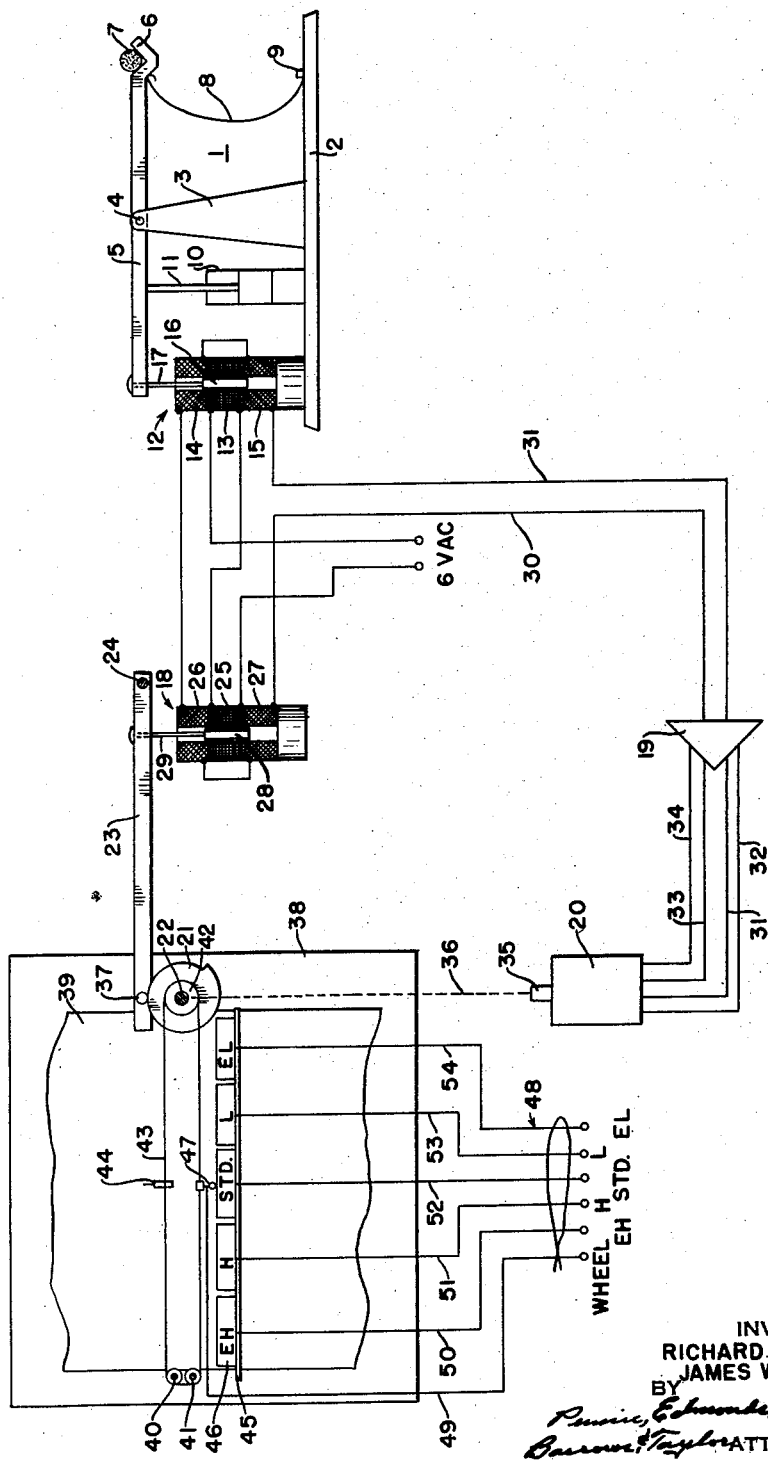

Sept. 29, 1959 R. P. HUDSON ET AL 2,906,456
CIGARETTE WEIGHING MACHINE
Filed May 9, 1956 2 Sheets-Sheet 1

INVENTORS
RICHARD P. HUDSON
JAMES W. MOONEY
BY
ATTORNEYS

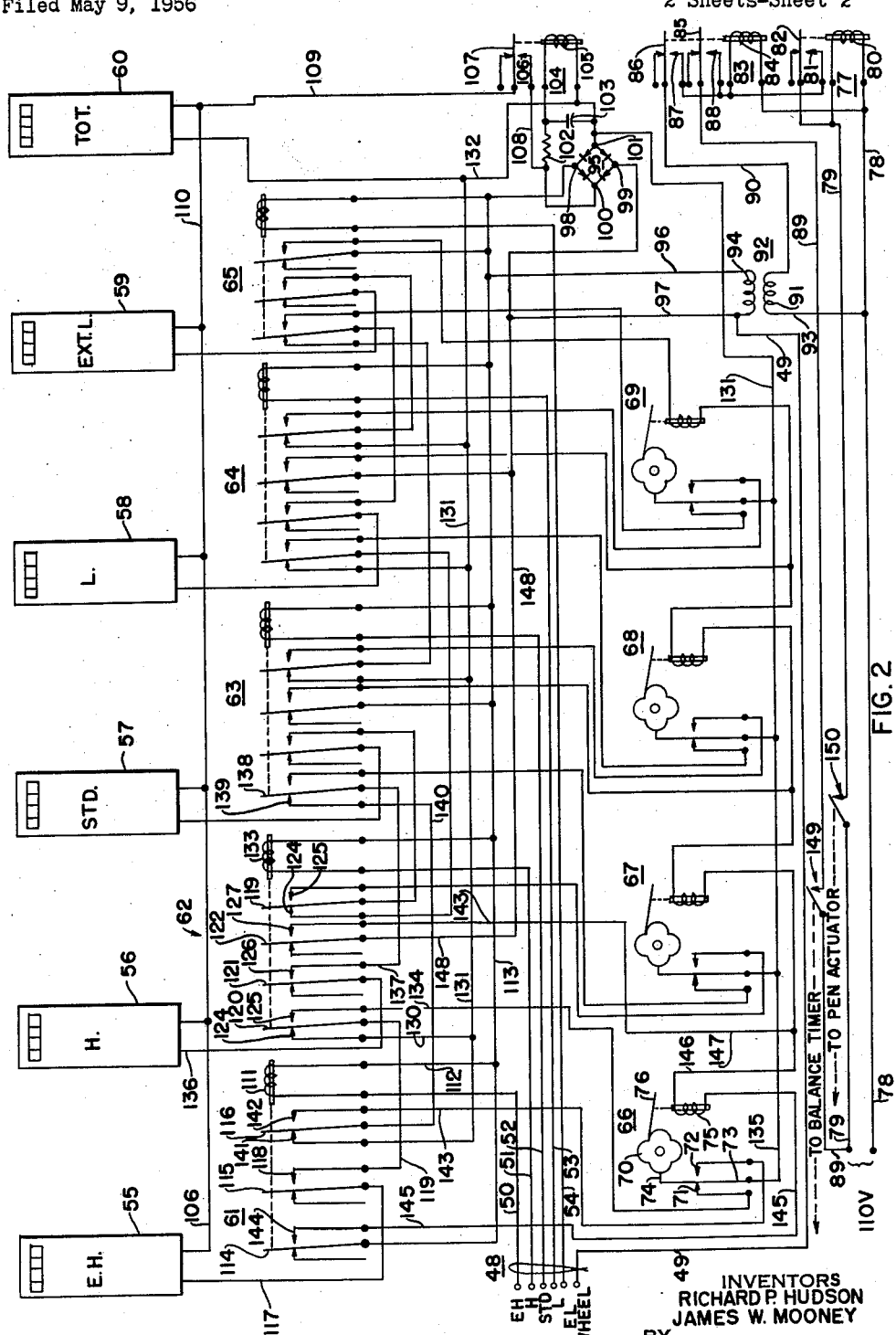

United States Patent Office 2,906,456
Patented Sept. 29, 1959

2,906,456

CIGARETTE WEIGHING MACHINE

Richard P. Hudson, Richmond, and James W. Mooney, Chesterfield County, Va., assignors to The American Tobacco Company, New York, N.Y., a corporation of New Jersey Application May 9, 1956, Serial No. 583,868

5 Claims. (Cl. 235—92)

This invention relates to an automatic weighing, recording and counting mechanism, and more particularly to an apparatus adapted for automatically weighing cigarettes and recording their weights, and counting the cigarettes whose weights are within predetermined weight ranges. The present application is a continuation-in-part of an application for Cigarette Weighing Machine of Richard P. Hudson and James W. Mooney, Serial No. 315,224, which was filed October 17, 1952, now abandoned.

Prior to our invention the cigarettes manufactured by machine or hand were tested for uniformity by operators who weighed individual cigarettes of a limited sample of the production in a pan balance. This requires that the operator wait until the balance comes to rest and then record the weight of each cigarette on a suitable record. A manual operation of this kind is, of course, very time-consuming if an appreciable sample of the production is to be weighed and recorded.

Several semi-automatic and automatic devices have been proposed by means of which a number of cigarettes, for example one hundred, are placed in a hopper, fed individually to a balance, weighed, and then the weight of each cigarette recorded without any manipulation by an operator. However the devices heretofore proposed have not been suitable for routine factory use. This was due to the necessity of mechanical adjustments of a highly critical nature and constant supervision by technically trained personnel.

The present invention provides an automatic weighing and recording mechanism that does not require supervision by trained personnel. Any suitable means, either manual or automatic is provided for feeding the individual cigarettes of the sample to the receiver of a beam balance and then removing them one at a time. The balance is arranged to actuate the input of a closed loop servo system which in turn drives a switching or commutator mechanism. The latter mechanism is arranged to divide the full range of the balance into a suitable number of sub-ranges, each including a possible range of weights of some of the cigarettes in the sample. Through a novel combination of relays, the switching system actuates a series of counters, each of which corresponds to one of the sub-ranges into which the full range of the balance is divided. The switching system and relays cause one or the other of the counters to tally each cigarette, the weight of which falls within a particular weight sub-range. The apparatus of the weighing and recording system includes means for positively relating the weighing operation to the counting operation and it includes means for uniformly distributing the tally of those cigarettes, the weights of which fall between any two adjacent sub-ranges, between the counters for these adjacent sub-ranges.

In the following portion of the specification we have set forth a detailed description of a particular embodiment of our invention which is illustrated in the accompanying drawings. In these drawings:

Fig. 1 is a schematic representation of a cigarette weighing and recording system according to our invention; and Fig. 2 is a diagrammatic representation of the relay and counter circuits which cooperate with the recording mechanism of Fig. 1.

Referring now to Fig. 1 there is indicated generally at 1 a beam balance. The balance has a base 2 on which are fixed a pair of spaced upright supports 3 having at their upper ends any suitable means 4 for gripping the opposite ends of a tightly stretched wire such as a piano wire. In the figure the wire is perpendicular to the plane of the paper. It serves, in lieu of a knife edge or other conventional support, as the fulcrum for the balance beam 5. At the right end of this beam there is a trough or receiver 6 for supporting a cigarette 7 which has been delivered to the balance by any suitable means, either manual or automatic. The receiver end of the beam is also connected to the upper end of a suitable spring 8, the opposite end of the spring being connected to the base 2 at 9. Thus, the movement of the beam, when the cigarette enters the receiver 6, is restrained by spring 8, which is in turn deflected to a degree proportionate to the weight of the cigarette. Unnecessary oscillations of the beam are damped by a suitable dash pot 10 connected to the beam through piston rod 11.

Displacement of the beam 5 by the weight of a cigarette is transmitted to the movable core 16 of a differential transformer 12 through rod 17. The transformer also comprises a central primary winding 13 and a pair of secondary windings 14 and 15. While the transformer is a standard article of commerce and can be purchased on the open market, its operation will be described to enable a complete understanding of the present invention.

The balance 1 and transformer 12 serve to drive a closed loop servo or follow-up system comprising a number of elements mounted in a separate cabinet which is not shown. These elements include a second differential transformer 18 which is identical with the transformer 12, a servo amplifier 19, a two-phase induction or servo motor 20, a spiral cam 21 rotatably mounted about an axis 22 and a cam follower beam 23 pivotally mounted about an axis perpendicular to the end of the beam at 24.

As previously stated the transformer 18 is identical with the transformer 12. It also has a central primary winding 25, a pair of secondary windings 26 and 27 wound on each side of the primary 25, and a movable core or armature 28 attached to the beam 23 by rod 29.

The primary windings 13 and 25 of the differential transformers are connected in series and are energized by a suitable source of alternating current. Thus, the voltage drop across each primary is identical. The two secondaries 14 and 15 of the transformer 12 are connected in series opposition to each other as are the secondary windings 26 and 27 of the transformer 18. The result is a zero or null output voltage when the core is symmetrically located and equal voltages are induced in the individual secondaries. On the other hand, when the position of the core is asymmetrical with respect to the two secondary windings 14 and 15 for example, due to displacement of the beam 5, the result is that one secondary will have a greater induced voltage than the other, thus resulting in a net voltage in the series connected secondaries which is definite in phase and magnitude. The foregoing remarks apply as well to the operation of the transformer 18.

The combined secondaries of the transformers 12 and 18 are themselves connected together in series opposition and provide the input voltage to servo amplifier 19 through conductors 30 and 31. This input voltage will also be of definite phase and magnitude depending on the relative positions of the transformer cores 16 and 28. The amplifier 19 is of a well-known type capable of highly accurate amplification of minute input signals to produce an output signal having the same phase and proportionate magnitude. Suitable amplifiers are standard articles available in the commercial market.

The output of the amplifier is made to energize the servo motor in the conventional manner. The error voltage, which is the highly amplified input voltage to the amplifier is applied to the motor 20 through the conductors 31 and 32 while the usual reference voltage is applied to the motor through the conductors 33 and 34 which are shown schematically as originating in the amplifier 19. Speed and direction of the motor 20 is thus determined by the relative position of the transformer cores 16 and 28.

The motor shaft 35 is mechanically connected, as indicated at 36, to the shaft 22 of the cam 21. This cam is a spiral, the radius of which varies in one turn between a maximum and minimum value. A cam follower 37 fixed to the beam 23 rides on the periphery of the cam and the proportions of the cam and beam are such that the core will be moved between its extreme positions within the windings during one revolution of the cam. From the foregoing, it follows that when the cores 28 and 16 are not in identical positions within their respective transformers the servo motor 20 will drive the cam in one direction or the other to make the position of the core 28 identical with that of the core 16 so that the opposed output voltages of the two transformers are nulled and the motor stops.

Our new apparatus is arranged to provide a graphical record in the following manner: A chart holder 38 carries a paper chart 39. The chart is made to move vertically in small, timed steps by any suitable means. A pulley 42 is fixed to the cam shaft 22 located at one side of the chart and guide pulleys 40 and 41 are arranged close to the opposite side of the chart. A cable 43 of some dimensionally stable material such as nylon passes around the guide pulleys 40 and 41 and the drive pulley 42. The cable 43 carries a recording pen 44 and this pen is moved by the cable transversely of the chart in exact relation to the rotation of the cam 21. By suitable electrical control, which is also old and well known, the pen 44 is caused to make a mark on the chart whenever cam 21 reaches an idle position. The chart is calibrated by vertical lines representing various weights within the capacity of the balance. Therefore the location of a mark made on the chart by the pen 44 is an exact record of the weight of the cigarette delivered to the receiver 6 of the balance.

We also provide means for tallying the number of cigarettes, the weights of which fall within any one of a plurality of sub-ranges of weights within the overall capacity of the balance. For purposes of illustration we will describe a system which divides the total capacity into five weight sub-ranges which will be designated EH (extra heavy), H (heavy), STD (standard), L (light), and EL (extra light). For the purposes of this description it is assumed that each of the sub-ranges is an equal fraction of the total capacity of the balance, although other relations could be arranged to fit special circumstances.

Fixed adjacent the cable 43 of the recording mechanism is an insulating commutator base 45 disposed transversely of the chart 39. The base 45 carries five switch or commutator segments 46 laid end to end which will hereinafter be referred to individually by their respective designations EH, H, STD, L, and EL. Each of these segments is a strip of conductive material such as silver and the length of each strip is slightly less than the width of that portion of the chart 39 corresponding to the scope of the particular weight sub-range. The ends of adjacent strips are separated by an amount which effectively insulates one strip from the adjacent strip or strips. The cable 43 carries a small conductive brush or wheel 47 which is arranged to engage the several segments 46 as it is carried back and forth by motion of the cable 43. The size and shape of the brush or wheel 47 is such that it can bridge the insulating gap between adjacent strips and make simultaneous contact with them.

A five-wire cable 48 is brought out from the recording mechanism and includes a conductor 49 from the wheel 47 and five conductive leads 50, 51, 52, 53, and 54 which are connected respectively to the commutator segments EH, H, STD, L, and EL. The cable and its respective leads are similarly designated in Fig. 2.

In Fig. 2 we have shown a counting system for tallying the number of cigarettes of a sample which fall in each of the weight sub-ranges within the overall capacity of the balance. A unique feature of the system shown in Fig. 2 is that it not only tallies each cigarette the weight of which falls within the limits of a sub-range, but that it also distributes the number of cigarettes the weight of which fall on the boundary between two adjacent sub-ranges. By this means our new automatic weighing and recording system accounts for every cigarette in a sample of the total production in a statistically logical fashion.

The apparatus shown schematically in Fig. 2 comprises five solenoid actuated direct current counters for the five sub-ranges of the balance. These counters are identified by the numerals 55–59, inclusive. A sixth counter for registering the total number of cigarettes tallied is indicated at 60. In this embodiment of our invention we also provide five alternating current counter relays 61, 62, 63, 64, and 65, each of which is arranged to cooperate primarily, although not exclusively, with one of the sub-range counters 55–59, respectively. The counter relays are of the conventional multipole double-throw type and are solenoid actuated through circuits which will be described in greater detail below.

The circuit of Fig. 2 also includes four distributing relays 66, 67, 68, and 69. These relays are the circuit components which uniformly distribute the tally of cigarettes, the weights of which fall on the dividing line between adjacent sub-ranges, between the counters for the adjacent sub-range. In this particular embodiment there are four of these which is one less than the number of sub-range counters 55–59. Each of the distributing relays is of the type having a solenoid actuated cam 70, a pair of switch points comprising left-hand point 71 and right-hand point 72, and a pivoted switch arm 73 actuated by a cam follower 74 riding on the lobes of the cam 70. A solenoid 75 operates an actuator 76 to cause the cam 70 to step around by one-eighth of a revolution each time a current impulse is applied to the solenoid. As the cam 70 has four lobes, the cam follower 74 will, with each one-eighth of a revolution of the cam, be alternately on a peak and then on a node of the cam causing the contact arm 73 to be first to the left in contact with the switch point 71 and then to the right in contact with switch point 72. The relays 67, 68, and 69 are identical to the relays 66 and will not be separately described.

The D.-C. counters, the A.-C. counter relays and the A.-C. distributing relays are all standard commercially obtainable components.

At 77 there is shown a single pole double-throw relay operating on 110 volts A.-C. through the connections to the A.-C. source 78 and 79, the circuit being opened and closed by a "set" microswitch 150 in the mechanism which causes the pen 44 in the recorder mechanism of Fig. 1 to make its mark on the chart 39. This microswitch is in the line 79 and the line 78 goes directly to the 100 volt sources. Thus when the servo motor 20 comes to rest and the pen is actuated to make its mark, the microswitch is made to close and a current impulse is applied to the solenoid of the relay 77. This actuates the contact arm 82 downwardly to close a circuit through the switch point 81 which in turn actuates a double-pole, double-throw relay 83 having a solenoid 84 and a pair of contact arms 85 and 86. Only the lower contacts 87 and 88 of this relay are active.

Now a momentary closing of the arm 82 and switch point 81 of relay 77 applies a current pulse to the coil 84 of relay 83 from the lines 78 and 79 which causes the arm 85 to engage the switch point 88. This provides for continuous energization of the coil 84 through the line 89 which is one side of a second 110 volt circuit which also includes the line 78. In the line 89 there is a microswitch 149 actuated by a timer or a mechanical means, the operation of which is related to the delivery and removal of cigarettes to the balance receiver. In its simplest form the switch may merely be manually closed during the weighing and recording operation of a single cigarette. The timer is arranged to close the circuit through line 89 for a time long enough to complete the weighing and recording of the weight of one cigarette. Thus the operation of the circuit to this point is as follows: The cigarette 7 is placed in the receiver 6 and the timer begins to run. When the motor 20 reaches a stable position the pen 44 is caused to make its mark on the chart 39 which simultaneously actuates the relay 77 for an instant. While the relay 77 is closed the relay 83 is also closed and locks itself in that condition through the lines 78 and 89, the relay 77 opening immediately after the pen 44 has made its mark.

The relay 83 controls a low voltage power source for the counters 55—60, for counter relays 61—65, and for the distributing relays 66—69. The primary 91 of step down transformer 92 is in circuit to one side of the 110 volt source through the connection 90 to the contact arm 86 and switch point 87 of relay 83 and the switch point is connected to line 89 through the switch point 88 and contact arm 85. The other side of the primary is connected to 78 through 93.

Transformer 92 supplies alternating current at about 6.3 volts to circuits for relays 61—65 and relays 66—69 from its secondary winding 94 through connections 96 and 97. Typical circuits for these relays will be described below.

The transformer secondary 94 also supplies current to the input terminals 98 and 99 of a full wave selenium rectifier 95, which has a resistance 102 and a capacitance 103 and the solenoid coil 105 of a single pole, double-throw delay relay 104 connected to the output terminals 100 and 101 of the rectifier. The resistance and capacitance are series connected between the terminals and the coil is in shunt to the capacitance. The purpose of the time delay circuit will be explained below in connection with the description of the operation of the circuit, but it is noted at this point that the resistance 102, the capacitance 103 and the inductance of the operating coil 105 combined provide an overall time constant of approximately one-tenth of a second. The exact value of this time constant is not critical although it will be seen that the delay in the operation of the relay 104 has a definite and valuable purpose in the overall operation of our counter system.

The D.-C. actuated counters are energized as follows: One output terminal of the rectifier is connected to the switch point 106 of relay 104 through the connection 108. And when the relay 104 is operated the contact arm 107 completes one side of a circuit to each of the counters 55—60 through the connections 109 and 110. The other output terminal of the rectifier is connected to the counters through the relays 61—65 to be described in greater detail presently.

To give a complete understanding of the operation of this embodiment of our invention it will be sufficient to describe in detail the connections which are brought into operation under two conditions. The first condition will be based on the supposition that the cigarette being weighed has a weight which is within the sub-range designated EH while the second condition will be based on the supposition that the weight of the cigarette being weighed is on the borderline between the EH and H sub-ranges.

Considering the first condition, it will be understood that the weight of the cigarette will move the core 16 of differential transformer 12 upwardly by a considerable amount. Assuming that the core 29 of differential transformer 18 was, prior to the weighing, in a central position, an input voltage will be impressed on the amplifier 19 which will cause the servo motor 20 to drive the cam clockwise as viewed in Fig. 1 until the core 28 is in a position corresponding to the position of core 16 at which time the motor 20 will stop. In accordance with the assumption stated above the wheel 47 will have been moved to the left to engage commutator segment 46EH. Actuation of the marking pen 44 will momentarily close relay 77 by means of microswitch 150 and this, in turn, will close relay 83. The latter will lock itself closed as previously described thereby energizing the primary of transformer 92.

Actuation of the extra-heavy counter 55 requires, first, that the relay 61 for this counter be actuated to the right which is accomplished by means of the following circuit. The contact wheel 47 is connected to one side of the transformer secondary 94 through the connection 49. It is seen that the circuit also includes the commutator strip 46EH, the connection 50 to the solenoid coil 111 of the relay 61, and the return to the transformer secondary through the connections 112, 113 and 96. Completion of this circuit actuates the relay 61 and moves its contact arms 114, 115, and 116 to the right from their normal positions to the left. The solenoids of relays 62, 63, 64 and 65 are not energized and therefore their respective contact arms remain in their normal positions to the left.

Now one side of the circuit which energizes the EH counter is as follows: the connection 117 from the counter to the contact arm 115, then through the switch point 118, the connection 119 to the contact arm 120 of the relay 62, the switch point 124, the connection 130, and the connection 131 to the connection 132 which is one output terminal of the rectifier 95.

The one side of the counter circuit just described is established in the time required for the solenoid of relay 61 to operate. This is normally less than a tenth of a second. However, to insure that the relay 61 has an opportunity to complete this side of the circuit before the counter is operated, the time delay circuit, i.e. resistance 102, capacitance 103 and the inductance of coil 105, is utilized to delay the operation of relay 104 for a time longer than that required for the operation of relay 61. By well-known means the voltage across capacitance 103 will increase gradually until, in a definite interval determined by the values of resistance 102, capacitance 103, and inductance of coil 105, it is sufficient to actuate the solenoid of relay 104 at which time the contact arm 107 is brought into contact with switch point 106 and this finally completes the circuit to the extra heavy counter 55 as previously described.

Upon completion of the circuit the counter will advance one count. Then the timer previously mentioned will cause the microswitch 149 in the connection 89 to break the circuit to the relay 83, thereby disabling the entire system of Fig. 2, at which time the counter relay 61 will return to its normal position with the contact arms to the left.

Before passing to the second condition of operation of the counter system it is to be noted that every time the delay relay 104 is energized there is also established a circuit to the total counter 60. This circuit includes the connection 132 from terminal 101 of the rectifier 95 to the counter 60 and the connection 109 to the contact arm 107, the switch point 106 and connection 108 to the rectifier terminal 100. Inasmuch as relay 104 must operate to complete a circuit to any one of the sub-range counters 55—59, it follows that every tally on any one of the sub-range counters is also registered on the total counter 60. Inclusion of the total counter in our system provides means for automatically indicating the number of cigarettes in a given sample of the production.

Turning now to the second condition of operation of the system of Fig. 2, assume that the cigarette being weighed has a weight which is on the borderline between the EH and H sub-ranges, in which case the motor 29 will drive the cam 21 until the wheel 47 engages the adjacent ends of the commutator strips 46EH and 46H. The preliminary operations of actuating relays 77 and 83 having occurred as before, it is now possible, because of wheel 47 simultaneously engaging with strips 46EH and 46H, that both the EH and H counters 55 and 56 could be made to add a count. But this would be undesirable inasmuch as a tally by both counters would give an erroneous count of the number of cigarettes actually in each sub-range and there would be a discrepancy between the sum of the counts shown on the sub-range counters and the total shown on the counter 60. A more useful arrangement is one which consistently tallies a cigarette, the weight of which falls between two adjacent sub-ranges, on the counter for either the higher or lower of the two sub-ranges in question while excluding it from the other. In this way an appropriate statistical correction can be made after the entire sample has been weighed. However, in this preferred embodiment, we have incorporated a novel means for evenly distributing the tally of cigarettes having borderline weights between the counters for adjacent sub-ranges. The result is an accurate representation of the statistical distribution of the weights of the cigarettes in the sample. This is achieved entirely automatically and requires no supervision of the apparatus by the operator.

Consider then that the wheel 47 has closed both the EH and H counter relay circuits through the leads 50 and 51 to the solenoids 111 and 133 of relays 61 and 62, respectively. The energizing circuit for solenoid 133 is similar in all respects to the corresponding circuit for solenoid 111 which was described above. Now the contact arms of both counter relays 61 and 62 are moved to the right and it will be observed that the portion of the EH counter circuit including the connection 117, the contact arm 115, switch point 118 and the connection 119 to the contact arm 120 of counter relay 62 no longer has continuity through the contact 124. It is now continued through the contact 125 inasmuch as the contact arm 120 has been moved to the right. Following out the circuit it is seen that contact 125 is connected by lead 134 to the left-hand contact 71 of the distributing relay 66. Assuming for the moment that the cam follower 74 is riding on a peak of a lobe of the cam 70, the circuit can be seen to be completed through the contact arm 73 and the connection 135 to one side of the output of the rectifier 95. This portion of the circuit together with the connections 110 and 109 from the EH counter to the contact arm 107 and switch point 106 of delay relay 104, and the connection 108 form a complete circuit for the EH counter to the output terminal 100 of the rectifier 95. The EH counter will thus be made to add one count.

Now despite the fact that the H counter relay 62 has been actuated, it can be seen that there is no complete circuit which will actuate the H counter itself. If only the H counter relay 62 had been actuated, but not the EH counter relay 61, the H counter circuit would be as follows: the counter connection 136 to the contact arm 121 of relay 62, the switch point 126, the connection 37 to the contact arm 138 of relay 63, the switch point 139, the connection 140 to the contact arm 116 of counter relay 61, the switch point 141, and then the connections 131 and 132 to the output terminal 101 of the rectifier 93. However, this is contrary to the assumption of the second condition of operation that the contact arms of both of relays 61 and 62 had been actuated to the right. Accordingly, the foregoing circuit can only be traced as far as the contact arm 116 of relay 61 from whence there could be no connection to the rectifier output terminal 101 through the connections 131 and 132. The continuity is broken because the contact arm 116 is out of engagement with the switch point 141. Rather, the contact arm 131 is now engaging the switch point 142 and the circuit continues through the connection 143 to the right hand switch point 72 of the distributing relay 66.

For the purposes of the illustration it has previously been assumed that the cam follower 74 is on a peak of a lobe of the cam 70 so that the contact arm 73 is to the left in engagement with the switch point 71 and out of engagement with the switch point 72. Therefore, there is no possible complete circuit between the H counter 56 and the output terminals of rectifier 95. On the other hand, there is, as previously explained, a complete circuit between the EH counter 55 and the rectifier. It follows that even though both counter relays 61 and 62 have been actuated by the wheel 47 engaging both commutator strips 46EH and 46H only the EH counter 55 will talk. It is also clear that if the cam follower 74 were resting at a node between adjacent lobes of the cam 70 that the circuits would have continuity to the H counter 56 through the contact arm 73 and the switch point 72 whereas there would be a discontinuity at the contact arm 73 and the switch point 71 in the circuit to the EH counter 55.

It will now be explained how the distributor relay 66 operates to evenly distribute the tally of successive borderline weight cigarettes between the counters for the adjacent sub-ranges. This is accomplished by energizing the solenoid 75 of the distributing relay 66 whenever both counter relays of adjacent sub-ranges are simultaneously energized. In this embodiment the actuator 76 advances the cam 70 by one-eighth of a revolution each time the solenoid 75 is energized. Inasmuch as the angular separation between a node and a peak on the cam 70 is one-eighth of a revolution, the cam follower 74 riding on the cam surface will alternately move the contact arm 73 into contact with switch point 72 and then into contact with switch point 71.

As previously stated the solenoids of the distributing relays 66—69 are energized by alternating current from the secondary of transformer 92. The solenoid circuit for relay 66 is typical of the circuits for the solenoids of the other three distributing relays. Since the coil 75 is in series with a normally open contact arm and switch point on each relay, its circuit is dependent for its completion on the actuation of both of relays 61 and 62. The circuit may be traced as follows: the transformer secondary lead 96, the connection 113 to the contact arm 114 of relay 61, the switch point 144, the connection 145 to the solenoid 75 of relay 66, then the connections 146 and 147 to the switch point 127 of relay 62, the contact arm 122, and the connections 148 and 97 back to the secondary 94 of the transformer 92.

The brief time interval provided by the delay circuit through which the delay relay 104 is energized is sufficient to insure that both counter relays 61 and 62 have time to operate and that the distributor relay 66 can perform its function of disabling one or the other of the counter circuits before the delay relay 104 can close and energize the counter circuits. Thus, even though the contact wheel 47 engages both commutator strips, only one counter is caused to tally. Successive repetitions of this condition, wherein contact wheel 47 engages two adjacent commutator strips, cause the counters for the adjacent ranges to tally alternately.

We have only described in detail the circuitry for the EH and H counters and their associated actuating circuits. However, it is to be understood that these circuits are typical of the corresponding circuits for all of the other counters and their associated actuating circuits. The drawings show these in full detail. Each of them may be traced out in the same manner as we have set forth above.

In summary, the operation of our new weighing and recording mechanism is as follows: Assuming a cigarette 7, the weight of which falls within the limits of the extra heavy sub-range, is placed on the receiver 6 the combination of the differential transformers 12 and 18 provide an input voltage to the amplifier 19 which drives the motor 20 until the cam 21 has been rotated into a position where the cores 28 and 16 of the transformers 18 and 12, respectively, are in positions which cause a net minimum or zero input voltage to the amplifier. At this time the motor 20 stops and the pen 44 is actuated to make a mark on the chart 39. Simultaneously a microswitch 150 in the pen actuating mechanism closes the circuit to the relay 77 which in turn closes the locking relay 83. So long as the locking relay is closed the primary 91 of transformer 92 is energized and there is a voltage available across the secondary 94 to energize both the A.-C. and D.-C. components of the system, D.-C. potentials being derived from the rectifier 95 which is connected to the secondary 94. The contact wheel 47 in engagement with the commutator strip 46EH establishes an A.-C. circuit, which energizes the solenoid 111 of the counter relay 61 to move the contact arms of the relay to the right. The contact arm 115, in engagement with the switch point 118, establishes a D.-C. circuit to one side of the actuating mechanism of EH counter 55. The other side of the D.-C. circuit to the counter 55 is established through the delay relay 104 a short time after the solenoid 111 is energized. Completion of the circuit to the counter 55 causes the counter to add one count. Upon removal of the cigarette 7 from the receiver 6 the timer microswitch 149 operating in conjunction with the balance 1 disables the energizing circuit of the locking relay 83 which removes the energizing potential from the primary of the transformer 92. The counter relay 61 then returns to its open position with the contact arms to the left.

Suppose then that the next cigarette to be weighed has a weight which causes the contact wheel 47 to stop over the insulating gap between the commutator strips 46EH and 46H and in contact with both of these strips. The same sequence of events as before will energize the transformer 92 and then the solenoids 111 and 133 of the counter relays 61 and 62 will both be energized. Thereupon a complete circuit is established through these relays to energize the solenoid 75 of distributing relay 66. This causes the cam 70 to be stepped around one-eighth of a revolution so that the contact arm 73 is moved into engagement with one or the other of the switch points 71 and 72.

The simultaneous energization of the counter relays 61 and 62 disables the normal circuits through which the EH counter 55 and the H counter 56 would be actuated. At the same time the simultaneous energization of relays 61 and 62 establishes a single circuit through the relay 66 to one or the other of the counters 55 and 56 depending on whether the contact arm 73 is to the left in contact with switch point 71 or to the right in contact with switch point 72. Thus, one and only one of the counters 55 or 56 is made to tally when the delay relay 104 is finally energized through the time delay circuit at the output of rectifier 95. The circuits are then disabled by the timer microswitch 149.

Assuming that the first cigarette, the weight of which was on the borderline between the EH and H sub-ranges resulted in the cam being stepped around so that the cam follower 74 rested on a peak of a lobe to complete a circuit to the EH counter, through the switch point 71, the next such cigarette on the borderline between these two sub-ranges will cause the cam to be stepped around an additional one-eighth of a revolution. Then the cam follower 74 will rest in a node between adjacent lobes and the contact arm 73 will engage the switch point 72 whereupon a circuit is completed to the H counter 56. And the next such cigarette will cause the distributor relay to complete a circuit to the EH counter 55 and so forth.

The distributor relay 67 cooperates in the same manner with the H counter 56 and the STD counter 57; relay 68 cooperates with the STD counter 57 and the L counter 58; and relay 69 works in conjunction with the L counter 58 and the EL counter 59.

We have described a particular embodiment of our invention solely for purposes of illustration. It will be apparent to those skilled in the art that many modifications of this particular embodiment may be made without departing from the scope of the invention as defined in the following claims.

We claim:

1. Apparatus for the enumeration of objects according to the correspondence of individual ones of the objects to one or the other of at least two sub-ranges of a particular variable characteristic common to the objects, the value of said characteristic varying at random from object to object, which apparatus comprises a commutator having an insulated conductive segment for each sub-range, contact means for engaging any one segment but not more than two segments for contiguous sub-ranges simultaneously, means sensitive of the variations of the characteristic, means responsive to said sensitive means for changing the engagement of said contact means with said segments in accordance with predetermined values of the randomly variable characteristic, an electrically actuated counter for each segment, each counter having associated therewith an electrically actuated multipole, double throw relay having a de-energized and an energized throw, an alternating current source of relay actuating current, a direct current source of counter actuating current comprising rectifying means having its input connected to said alternating current source, an electrically actuated delay relay having its actuating means energized by the output of said rectifying means through a time constant circuit for delaying the actuation of said delay relay, an electrically actuated distributing relay cooperating with the counter relays of each two counters for contiguous sub-ranges, said distributing relay being constructed and arranged to establish with each successive energization thereof an alternate electrical connection therethrough, counter relay actuating circuits between said counter relay source and the actuating means of said counter relays, each counter relay circuit including one of said segments, said contact means being common to all counter relay circuits, distributing relay actuating circuits between said counter relay source and the actuating means of said distributing relay circuits including a contact arm and a switch point on the energized throw of each of the counter relays cooperating with that distributing relay, and a counter actuating circuit between the counter source and the actuating means of each counter, said last-named circuit comprising a contact arm and a switch point on the energized throw of the relay associated with that counter and one of the alternate connections through said distributing relay, and the contact arm and switch point on the energized throw of said delay relay, whereby completion of the circuits for counter relays for contiguous sub-range counters by means of said contact means simultaneously engaging the segments for contiguous sub-ranges actuates both of the counter relays to their energized throws thereby actuating said distributing relay to make its next alternate connection and partially establish a counter actuating circuit prior to its completion through said delay relay.

2. Apparatus for the enumeration of objects according to the correspondence of individual ones of the objects to one or the other of at least two sub-ranges of a particular variable characteristic common to the objects, the value of said characteristic varying at random from object to object, which apparatus comprises a commutator having an insulated conductive segment for each sub-range, contact means for engaging any one segment but not more than two segments for contiguous sub-ranges simultaneously, means sensitive of the variations of the randomly variable characteristic, means responsive to said sensitive means for changing the engagement of said contact means with said segments in accordance with predetermined values of the randomly variable characteristic, an electrically actuated counter for each segment, each counter having associated therewith an electrically actuated multipole, double throw relay having a de-energized and an energized throw, a source of counter actuating current, a source of relay actuating current, an electrically actuated distributing relay cooperating with the counter relays of each two counters for contiguous sub-ranges, said distributing relay being constructed and arranged to establish with each successive energization thereof an alternate electrical connection therethrough, counter relay actuating circuits between said counter relay source and the actuating means of said counter relays, each counter relay circuit including one of said segments, said contact means being common to all counter relay circuits, distributing relay actuating circuits between said counter relay source and the actuating means of said distributing relay circuits including a contact arm and a switch point on the energized throw of each of the counter relays cooperating with that distributing relay, and a counter actuating circuit between the counter source and the actuating means of each counter, said last-named circuit comprising a contact arm and a switch point on the energized throw of the relay associated with that counter and one of the alternate connections through said distributing relay, whereby simultaneous engagement of commutator segments for contiguous sub-ranges by said contact means results in a complete actuating circuit to only one of said counters.

3. Apparatus for the enumeration of objects according to the correspondence of individual ones of said objects to one or another of at least two sub-ranges of a particular variable characteristic common to the objects, the value of said characteristic varying at random from object to object, which apparatus comprises at least two electrically actuated counters, each of said counters having associated therewith an electrically actuated, double throw relay having a deenergized and an energized throw, a source of counter actuating current, a source of relay actuating current, a commutator having an insulated conductive segment for each of said counters, driven contact means adapted to severally engage said segments, means for driving said contact means to predetermined different ones of said segments in response to the random variations of said characteristic, counter relay energizing circuits between said relay source and the actuating means of said counter relays, each of said counter relay circuits including one of said commutator segments, said contact means being common to all of said counter relay circuits, and counter actuating circuits between said counter source and said counters, each of said counter circuits including a contact arm and a switch point on the energized throw of the counter relay associated with that counter, whereby completion of a counter relay circuit by means of said contact means engaging one of said segments actuates one of said relays to its energized throw and thereby completes the circuit to the associated counter, causing it to tally.

4. Apparatus for the enumeration of objects according to the correspondence of individual ones of said objects to one or another of at least two-subranges of a particular variable characteristic common to the objects, the value of said characteristic varying from object to object, which apparatus comprises a commutator having an insulated conductive segment for each sub-range, contact means for severally engaging said segments, means sensitive of the variations of the characteristic, means responsive to said sensitive means for changing the engagement of said contact means according to predetermined values of the randomly variable characteristic, an electrically actuated counter for each sub-range, each counter having associated therewith an electrically actuated double throw relay having a de-energized and an energized throw, a source of counter actuating current, a source of relay actuating current, counter relay energizing circuits between said relay source and the actuating means of said counter relays, each of said counter relay circuits including one of said commutator segments, said contact means being common to all of said counter relay circuits, and counter actuating circuits between said counter source and said counters, each of said counter circuits including a contact arm and a switch point on the energized throw of the associated counter relay whereby engagement of a particular segment of the commutator by said contact means in accordance with a value sensed by the sensing means completes a counter relay circuit corresponding to the sub-range of that value to actuate the relay to its energized throw which in turn completes the associated counter circuit to cause that counter to tally.

5. Apparatus for the enumeration of objects according to the correspondence of individual ones of said objects to one or another of at least two sub-ranges of a particular variable characteristic common to the objects, the value of said characteristic varying at random from object to object, which apparatus comprises at least two electrically actuated counters, each of said counters having associated therewith an electrically actuated, double throw relay having a de-energized and an energized throw, an alternating current source of relay actuating current, a direct current source of counter actuating current comprising rectifying means having its input connected to said alternating current source, an electrically actuated delay relay having its actuating means energized by the output of said rectifying means through a time constant circuit for delaying the actuation of said delay relay, a commutator having an insulated conductive segment for each of said counters, driven contact means adapted to severally engage said segments, counter relay energizing circuits between said relay source and the actuating means of said counter relays, each of said counter relay circuits including one of said commutator segments, said contact means being common to all of said counter relay circuits, and counter actuating circuits between said counter source and said counters, each of said counter circuits including a contact arm and a switch point on the energized throw of the counter relay associated with that counter and the contact arm and switch point on the energized throw of said delay relay, whereby completion of the counter relay circuit by means of said contact means engaging one of said segments actuates one of said counter relays to its energized throw and partially establishes a counter actuating circuit prior to the completion thereof through said delay relay.

References Cited in the file of this patent

UNITED STATES PATENTS

| | | |
|---|---|---|
| 1,629,221 | MacNutt | May 17, 1927 |
| 2,353,002 | Armbruster | July 4, 1944 |
| 2,375,413 | Guenther | May 8, 1945 |
| 2,600,817 | Victoreen | June 17, 1952 |
| 2,606,236 | Oberman | Aug. 5, 1952 |
| 2,610,052 | Macgeorge | Sept. 9, 1952 |
| 2,652,977 | Levy | Sept. 22 1953 |
| 2,709,076 | Hansen | May 24, 1955 |
| 2,746,679 | Stratton et al. | May 22, 1956 |

FOREIGN PATENTS

| | | |
|---|---|---|
| 522,736 | Great Britain | June 26, 1940 |